United States Patent [19]
Shanklin

[11] 3,936,325
[45] Feb. 3, 1976

[54] FIBROUS BLANKET CONTAINING SOLDER FLUX AND SOLDER FLUX WITH INCREASED MELTED VISCOSITY

[76] Inventor: Dunbar L. Shanklin, 12 Everett Ave., Winchester, Mass. 01890

[22] Filed: Sept. 23, 1974

[21] Appl. No.: 508,725

Related U.S. Application Data

[63] Continuation of Ser. No. 311,513, Dec. 4, 1972, abandoned, which is a continuation-in-part of Ser. No. 96,598, Dec. 9, 1970, abandoned, and a continuation-in-part of Ser. No. 96,631, Dec. 9, 1970, abandoned.

[52] U.S. Cl. .................................. 148/26; 148/23
[51] Int. Cl.² ........................................ B23K 35/34
[58] Field of Search .............................. 148/23, 26

[56] References Cited
UNITED STATES PATENTS

| | | | |
|---|---|---|---|
| 3,380,862 | 4/1968 | O'Brien | 148/26 |
| 3,814,637 | 6/1974 | Scott | 148/26 |

*Primary Examiner*—Peter D. Rosenberg
*Attorney, Agent, or Firm*—Robert E. Meyer

[57] ABSTRACT

This invention relates to the use of a zinc-ammonium chloride solder flux of the type intended to be used on high temperature solder baths of an inert or partially inert three dimensional fibrous blanket to impede the circulation of the thin melted zinc-ammonium chloride flux on the surface of the high temperature solder bath and thus extend the life of the solder flux by reducing the volatilization of the ammonium chloride active fluxing agent.

This invention also relates to the use in a zinc-ammonium chloride solder flux of the type intended to be used on high temperature solder baths of a viscosity thickening ingredient which increases the viscosity of the melted flux sufficiently to stop the normal circulatory stirring motion of the thin liquid melted zinc-ammonium chloride flux but permits a limited turn-over motion at the interface of the rotating solder roll and the bath of melted flux, with the balance of the melted flux remaining essentially stationary. This circulation inhibiting action results in the top surface of a large portion of the melted flux bath becoming cooler than the high temperature of the solder and thus extends the life of the solder flux by reducing the volatilization of the ammonium chloride active fluxing agent.

15 Claims, No Drawings

FIBROUS BLANKET CONTAINING SOLDER FLUX AND SOLDER FLUX WITH INCREASED MELTED VISCOSITY

CROSS REFERENCE TO RELATED APPLICATIONS

This application is a continuation of my prior copending application Ser. No. 311,513, filed Dec. 4, 1972, and now abandoned, which in turn was in part a continuation of my prior copending application Ser. No. 96,598, filed Dec. 9, 1970, and now abandoned; and in part a continuation of my prior copending application Ser. No. 96,631, filed Dec. 9, 1970, and now abandoned, and contains no subject matter not disclosed in any of the aforesaid prior copending applications.

BRIEF SUMMARY OF THE INVENTION

This inventiion relates to an inert or partially inert fibrous blanket especially suitable for use in connection with solder fluxes intended for use on high temperature solder baths. This invention also relates to solder fluxes especially adapted to be used on high temperature solder baths and containing the aforesaid blanket-forming fibers which are inert or partially inert at the temperature of use in the presence of the molten solder and the melted flux.

This invention also relates to the use in a zinc-ammonium chloride solder flux of the type intended to be used on high temperature solder baths of a viscosity thickening ingredient which increases the viscosity of the melted flux sufficiently to stop the normal circulatory stirring motion of the thin liquid melted zinc-ammonium chloride flux but permits a limited turnover motion at the interface of the rotating solder roll and the bath of melted flux. This invention also relates to solder fluxes especially adapted to be used on high-temperature solder baths and containing the aforesaid viscosity thickening ingredient.

The purpose of the present invention is to provide means for extending the useful life of fluxes, especially fluxes of the type used in conjunction with high temperature solder baths such as those employed in the can-making industry. The normal can is made by first forming a tubular can body and thereafter applying a can end to both ends of this body. The normal can body is made by forming a flat, sheet metal, body blank in which a pair of marginal edges opposing one another are bent back upwardly on one edge, downwardly on the other, to form "body hooks." In the can body maker, the body blanks are bent to form a cylinder with the body hooks interlocked. The hooks are then flattened by bumping and molten solder is flowed into the interlocked seam by passing the seam over a solder roll which rotates in a bath of molten solder.

Historically, except for a few specialty cans, where a pure tin solder is used for the side seams, the conventional solder used in the can industry was a solder containing 40% tin and 60% lead—a so-called 40–60 solder. More recently the tendency has been to use a low tin solder with a tin content ranging from between 2 to 4% such as the so-called 2–98 solder which contains 2% tin and 98% lead for the side seam of normal tin cans. The change-over from a 40–60 solder to a 2–98 solder has been accelerated for two reasons. In the first place, a solder containing 2 to 4% tin such as the 2–98 solder, has a much quicker freezing point, or a much smaller solidification temperature range than does a 40–60 solder. The use of such a low tin solder not only permits the body maker to be operated at a faster rate, but also reduces the possibility that the side seam will be distorted between the time that the solder is applied and the time that the solder solidifies. Secondly, since the cost of tin is somewhat higher than the cost of lead, the use of a low tin solder reduces the cost of manufacture. As a result, under present can making practice, approximately 90% of all cans having a solder side seam are made using a low tin solder.

The change-over from the use of 40–60 solder to 2–98 solder has not been without its difficulties. In the first place, the melting point of a 2–98 solder is substantially higher than that of a 40–60 solder. As a result in replacing a 40–60 solder with the 2–98 solder it has been necessary to raise the temperature of the solder bath. Since a 2–98 solder has a melting point of about 625° F. and it is necessary to maintain the temperature of the solder in the bath at a level about 100° F. in excess of the melting point, solder baths containing a 2–98 solder are normally maintained at a temperature of about 725° F. but may vary between 690° F. and 760° F.

In addition, as is well known, it is necessary in order to form a smooth even film of solder on the solder roll, that the steel solder roll be well "tinned," i.e. that a layer of $FeSn_2$ be maintained on the surface of the roll. The reduction of the tin content of the solder makes it that much more difficult to maintain the roll in a well tinned condition. To do so requires the use of a very strong, highly active flux.

Such a flux is the zinc-ammonium chloride flux of the general type that has been used by can makers for the past fifty years to protect the molten solder on the solder bath, and to clean and tin the surface of the solder roll. When used to maintain the surface of the solder roll in a well tinned condition in the presence of a low tin solder such as 2–98 solder it is necessary that the flux be maintained in a molten state and that it contain a relatively high percentage of ammonium chloride in combination with the zinc chloride. There is a limit, however, to the proportion of ammonium chloride that can be used in combination with zinc-chloride in such a flux. If the proportion of ammonium chloride in such flux exceeds about 38% by weight on the total weight of the zinc chloride plus the ammonium chloride the flux will not melt even at temperatures in excess of 760° F. Rather the excess ammonium chloride is released by sublimation. Pure ammonium chloride sublimes at a temperature of 640° F. The 2:1 zinc ammonium chloride double salt which contains two mols of ammonium chloride for each mol of zinc chloride and is therefore 44% by weight of ammonium chloride on the total weight of the double salt loses ammonium chloride by sublimation at about this same temperature.

When a zinc ammonium chloride flux composition containing more than 38% by weight of ammonium chloride is heated to 650° F. or above, the loss of ammonium chloride by sublimation is quite rapid with the flux composition evolving voluminous clouds of white ammonium chloride smoke. When through the loss of ammonium chloride the ratio of ammonium chloride by weight to the weight of the total zinc ammonium chloride is reduced to 38% the zinc ammonium chloride melts readily into a thin oily liquid. The rate of loss of ammonium chloride by sublimation however, is not reduced substantially until the proportion of ammonium chloride by percent weight of the total chlorides is reduced to a much lower level than the 38% at which the zinc ammonium chloride composition melts. Thus the melted zinc ammonium chloride flux composition continues to boil vigorously unless something is done to prevent the rapid loss of ammonium chloride. If the flux is maintained at a temperature of 650° F. the loss of ammonium chloride will continue until the percentage by weight of the ammonium chloride based on the total weight of the zinc chloride plus ammonium chloride falls to about 15%. At this point an equilibrium condition is reached and the rate of loss of the ammonium chloride from the zinc ammonium chloride composition is drastically reduced. If, however, the temperature of the melted zinc ammonium chloride flux is maintained at a level of 725°–750° F. such an equilibrium condition is not reached until the precentage by weight of the ammonium chloride in the flux reaches a level of about 5 or 6%, and the ammonium chloride will continue to boil away from the flux composition until sufficient ammonium chloride has been lost to bring the weight percent down to this level.

This loss of ammonium chloride from the zinc ammonium chloride flux composition reduces the fluxing efficiency, and eventually, when the percentage of ammonium chloride becomes too low, the flux becomes "spent" and must be removed from the solder bath and replaced by a layer of fresh flux. The spent flux still has considerable capacity to absorb lead and tin oxide, but its speed of action has become too slow to maintain a uniform layer of solder on the rapidly rotating steel solder roll. In a typical body maker where a 4 inch diameter solder roll is rotated at 120 r.p.m., the time of contact of the surface of the roll with a ½ inch layer of melted fux on the suface of the solder bath during each revolution is only 1/50 second which is an extremely short interval of time. Hence a storng active flux is needed to provide the fast fluxing action required.

Although most solder baths are maintained at a temperature of about 725° F., over the past five years many can manufacturers have increased the operating speeds of their can bodymakers, — some to speeds as high as 500 to 525 cans per minute. This has necessitated higher solder bath temperatures to obtain the proper flow of the 2–98 solder in the locked side seam. Today about one-third of all bodymakers employing 2–98 solder use an operating temperature of 750° F. and the trend is to this temperature.

At 750° F., a typical zinc-ammonium chloride flux has a total life of less than three hours even with the addition of additional fresh flux composition. During this period and especially during the first hour from the start, the melted flux boils and circulates vigorously on the surface of the hot molten solder evolving voluminous clouds of white ammonium chloride smoke. The average solder pot uses a 5 pound initial charge of solder flux. During the first hour, the 5 pounds of solder flux lose about 1 pound of ammonium chloride as a white aerosol smoke whose particle size ranges from 3 microns to 0.1 microns. According to W. L. Faith, "Air Pollution Control", Wiley, 1959, "An atmosphere having an aerosol concentration of about 1 mg./m$^3$ has been estimated to limit visibility to 1600 ft. The mass would contain perhaps 16,000 particles/ml."

An average can plant has about ten can lines, which when started up in the morning would emit during the first hour ten pounds of volatilized ammonium chloride. This is equal to 4,540,000 mgs. At a concentration of 1 mg. per cubic meter this would produce a fog with one-third of a mile visibility in 160,000,000 cubic feet of air,— enough to completely envelop a 100,000 square foot can plant.

I am not familiar with the nucleating property of micron size particles of ammonium chloride, but since these extremely fine crystals are somewhat hygroscopic I should imagine that they would have a tendency to produce smog. At any rate, the Texas Air Control Board has set a limit for particulate matter of 125 micrograms per cubic meter in any 24-hour period with an annual average of 55 micrograms per cubic meter. To meet this Texas 125 micrograms per cubic meter air pollution regulation the ten pounds of white ammonium chloride smoke would have to be dispersed through 1.3 billion cubic feet of air. The problem is serious because ammonium chloride dissociates into $NH_3$, a weak base, and HCl, a strong acid, and is extremely corrosive.

In the specification of my U.S. Pat. No. 3,350,244, I have described this boiling out of ammonium chloride from a zinc ammonium chloride melted flux at 725° F. as follows:

For a 31% $NH_4Cl$ Flux.

"The flux melted readily with active boiling and an initial evolution of voluminous clouds of white ammonium chloride smoke".

For a 36% $NH_4Cl$ Flux.

"After melting, it boiled violently with an evolution of voluminous clouds of white ammonium chloride smoke".

As explained earlier, many can-makers have had to raise their solder bath temperatures from 725° F. to 750° F. to accommodate the speed-up of their can body-makers, which now frequently exceed 500 cans per minute. A 25° F. increase in temperature from 725° F. to 750° F. may not at first glance seem significant or important; but it raises the differential above the subliming point, 650° F., from 75° F. to 100° F.,— an increase of 33%. The result is startling. Earlier methods of suppressing the rapid loss of the active but volatile ammonium chloride begin to break down under this high vapor pressure differential.

The viscosity of zinc ammonium chloride melted solder fluxes at 750° F. is very low,— almost that of gasoline at room temperature. The thin melted flux is subjected to two strong circulating forces, (1) the normal thermal action of a liquid on a very hot surface assisted by the sublimation of the ammonium chloride and (2) the mechanical stirring caused by the downward moving face of the solder roll. This latter action is highly interesting. It resembles the action at the base of a waterfall where the descending stream of water carries below the surface of the pool and causes whirlpools of high intensity.

I have described this simply as a circulatory motion of the melted flux on the surface of the solder bath; but the motion or motions are more complex than this. In order to study the circulation I placed a few of the active granules described in my U.S. Pat. No. 3,350,244 on the surface of the melted flux and watched the pattern traced by these granules as they whirled around the circuit. Sometimes there were two oval circuits joining in the middle of the solder pot. Sometimes there were three whirlpools and sometimes four. All had two common characteristics:—they were rapid and they kept bringing the hot flux from the surface of the molten solder to the top of the liquid, thereby accelerating the sublimation of ammonium chloride.

DETAILED DESCRIPTION

I have discovered an effective way to impede this free circulation of the very thin melted flux and thus extend the life of the solder flux by reducing the volatilization of the ammonium chloride active fluxing agent. My improved composition at the same time greatly reduces the air pollution which is acute because the sublimed ammonium chloride is in the form of an aerosol.

Briefly, this is accomplished by providing the flux composition with a sufficient quantity of inert or partially inert fibrous materials to form a three-dimensional blanket which extends over the area encompassed by the flux when the flux is molten.

In the following examples I describe the performance of my new solder flux compositions containing various proportions of inorganic fibers and compare them with control fluxes.

The various solder fluxes were tested under conditions that duplicated commercial conditions as closely as possible. In these tests a roll solder bath was used that was made to duplicate a typical commercial roll solder bath in every detail except for the width of the bath and of the roll.

Specifically, the solder bath used in all of the following tests comprises a thick walled metal tank 10 inches long, 6¼ inches wide and 4 inches deep. A solder roll 6 inches long and 4 inches in diameter was mounted across the tank with its center line equidistant between the ends and 2½ inches above the bottom of the tank. The tank was filled with a quantity of 2-98 solder sufficient to maintain the level of the molten solder at the center line of the roll (about 35 pounds). The tank is gas heated and thermostatically controlled to maintain the temperature of the solder to within 5° F. ± of the indicated temperature. The roll was rotated at 120 r.p.m.

In each test, the flux was placed on top of the molten solder in that portion of the tank where the rotating roll reentered the solder an area 3 inches by 6¼ inches. The flux in each instance was stirred once each hour. In every test the flux was considered to be spent as soon as noticeable areas on the rotating roll failed to be wetted by the molten solder. The test results were reproducible to less than fifteen minutes and the test results correlated very well with field results under commercial conditions.

TABLE I

FLUX
Parts by Weight

| Example | Composition Code | $ZnCl_2$ | $NH_4Cl$ | $ZnCl_2 \cdot 2NH_4Cl$ | ZnO | % $NH_4Cl$ after melting |
|---|---|---|---|---|---|---|
| A | Control A | | | 940 | 60 | 35 |
| B | Control B | 650 | 350 | | | 35 |
| C | Control C | | | 800 | 70 | 31.5 |
| D | Control D | 500 | | 500 | | 22 |
| E | Control E | 100 | | 700 | 100 | 21 |
| F-1 | LFA-2.0 | | | 926 | 59 | 35 |
| F-2 | LFA-1.5A | | | 926 | 59 | 35 |
| F-3 | LFA-1.5B | 650 | 350 | | | 35 |
| F-4 | LFA-1.0 | | | 926 | 59 | 35 |
| F-5 | LFA-0.5 | | | 926 | 59 | 35 |
| F-6 | LFA-0.3 | | | 926 | 59 | 35 |
| F-7 | LFA-0.2 | | | 926 | 59 | 35 |
| F-8 | LFA-1.0D | 500 | | 500 | | 22 |
| F-9 | LFA-3.0 | | | 926 | 59 | 35 |
| F-10 | LFA-4.5 | | | 926 | 59 | 35 |
| F-11 | LFA-4.5D | 500 | | 500 | | 22 |
| F-11Z | CHR3Z-0.5 | | | 926 | 59 | 35 |
| F-12 | AMS33-2.0 | | | 940 | 60 | 35 |
| F-13 | AMS33-1.0 | | | 940 | 60 | 35 |
| F-14 | AMS33-0.5 | | | 940 | 60 | 35 |
| F-15 | AMS33-0.2 | | | 940 | 60 | 35 |
| F-16 | AMS33-0.1 | | | 940 | 60 | 35 |
| F-17 | AMD11-0.1 | | | 940 | 60 | 35 |
| F-18 | CRS80-2.0 | | | 940 | 60 | 35 |
| F-19 | CRS80-1.0 | | | 940 | 60 | 35 |
| F-20 | CRS80-0.5 | | | 940 | 60 | 35 |
| F-21 | CRS80-0.2 | | | 940 | 60 | 35 |
| F-22 | CRS80-0.1 | | | 940 | 60 | 35 |
| F-23 | CRH-0.1 | | | 940 | 60 | 35 |
| F-24 | CRS80-3.5 | 500 | | 500 | | 22 |
| F-25 | CARBON-0.2 | | | 940 | 60 | 35 |

INORGANIC FIBERS
Parts by Weight

| Example | | | Smoke ½ hour after Start | Flux Life minutes |
|---|---|---|---|---|
| A | | | Vol. | 160 |
| B | | | Vol. | 160 |
| C | | | Vol. | 145 |
| D | | | V.Heavy | 140 |
| E | | | V.Heavy | 135 |
| F-1 | 20 | Chrysotile Asbestos 3-R | Light | 470 |
| F-2 | 15 | | Medium | 435 |
| F-3 | 15 | | Medium | 435 |
| F-4 | 10 | | Medium | 400 |
| F-5 | 5 | | V.Heavy | 285 |

TABLE I-continued

FLUX
Parts by Weight

| Example | Composition Code | ZnCl$_2$ | NH$_4$Cl | ZnCl$_2$·2NH$_4$Cl | ZnO | % NH$_4$Cl after melting |
|---|---|---|---|---|---|---|
| F-6  | 3  |   |   | V.Heavy | | 220 |
| F-7  | 2  |   |   | V.Heavy | | 200 |
| F-8  | 10 |   |   | Light   | | 375 |
| F-9  | 30 |   |   | Light   | | 400 |
| F-10 | 45 |   |   | Too much fiber | | |
| F-11 | 45 |   | '' | Too much fiber | | |
| F-11Z | 5 | Chrysotile Asbestos 3-Z |   | Heavy   | | 380 |
| F-12 | 20 | Amosite Asbestos S-33   |   | V.Light | | 505 |
| F-13 | 10 |   |   | Light   | | 480 |
| F-14 | 5  |   |   | Medium  | | 360 |
| F-15 | 2  |   |   | Heavy   | | 215 |
| F-16 | 1  |   | '' | Heavy   | | 205 |
| F-17 | 1  | Amosite Asbestos D-11 |   | Heavy   | | 205 |
| F-18 | 20 | Crocidolite Asbestos S-80 |   | Light   | | 455 |
| F-19 | 10 |   |   | Light   | | 475 |
| F-20 | 5  |   |   | Medium  | | 540 |
| F-21 | 2  |   |   | Heavy   | | 260 |
| F-22 | 1  |   |   | V.Heavy | | 185 |
| F-23 | 1  |   | '' | V.Heavy | | 185 |
| F-24 | 35 | Crocidolite Asbestos S-80 |   | V.Light | | 315 |
| F-25 | 2  | Carbon Fiber Tow |    | Light   | | 270 |

TABLE II

FLUX
Parts by Weight

| Example | Composition Code | ZnCl$_2$ | NH$_4$Cl | ZnCl$_2$·2NH$_4$Cl | ZnO | % NH$_4$Cl after melting |
|---|---|---|---|---|---|---|
| A | Control A |     |     | 940 | 60 | 35 |
| B | Control B | 650 | 350 |     |    | 35 |
| C | Control C |     |     | 800 | 70 | 31.5 |
| D | Control D | 500 |     | 500 |    | 22 |
| E | Control E | 100 |     | 700 | 100| 21 |
| F-26 | BFG-2.0 |   |     | 940 | 60 | 35 |
| F-27 | BFG-1.0 |   |     | 940 | 60 | 35 |
| F-28 | Pyrex-2.5 | |     | 940 | 60 | 35 |
| F-29 | Pyrex-1.5 | |     | 940 | 60 | 35 |
| F-30 | Pyrex-0.5 | |     | 940 | 60 | 35 |
| F-31 | Pyrex-0.2 | |     | 940 | 60 | 35 |
| F-32 | Pyrex-0.3C| |     | 800 | 70 | 31.5 |
| F-33 | Pyrex-0.1D| 500 |   | 500 |    | 22 |
| F-34 | RW-2.0 |    |     | 940 | 60 | 35 |
| F-35 | RW-1.0 |    |     | 940 | 60 | 35 |
| F-36 | WRW-8.0 |   |     | 940 | 60 | 35 |
| F-37 | WRW-4.0 |   |     | 940 | 60 | 35 |
| F-38 | WFF-3.0 |   |     | 940 | 60 | 35 |
| F-39 | WFF-2.0 |   |     | 940 | 60 | 35 |
| F-40 | WFF-1.0 |   |     | 940 | 60 | 35 |
| F-41 | WFF-0.5 |   |     | 940 | 60 | 35 |
| F-42 | LSFF-0.2 |  |     | 940 | 60 | 35 |
| F-43 | QW-1.0 |    |     | 940 | 60 | 35 |
| F-44 | QW-0.1 |    |     | 940 | 60 | 35 |

INORGANIC FIBERS
Parts by Weight

| Example | | | Smoke ½ hour after Start | Flux Life minutes |
|---|---|---|---|---|
| A |    |                              | Vol.     | 160 |
| B |    |                              | Vol.     | 160 |
| C |    |                              | Vol.     | 145 |
| D |    |                              | V.Heavy  | 140 |
| E |    |                              | V.Heavy  | 135 |
| F-26 | 20 | Baked Fiberglas Corning No. 8670 | Medium | 465 |
| F-27 | 10 | ''                           | Medium   | 410 |
| F-28 | 25 | Pyrex Fiberglas Corning No. 3950 | Medium | 400 |
| F-29 | 15 |                              | Light    | 430 |
| F-30 | 5  |                              | Medium   | 370 |
| F-31 | 2  |                              | Heavy    | 340 |
| F-32 | 3  |                              | Medium   | 210 |
| F-33 | 1  | ''                           | Medium   | 220 |
| F-34 | 20 | Rock Wool USG                | V.Heavy  | 365 |
| F-35 | 10 | ''                           | V.Heavy  | 245 |
| F-36 | 80 | Washed Rock Wool USG         | V.Light  | 360 |
| F-37 | 40 | ''                           | V.Light  | 490 |
| F-38 | 30 | Washed Bulk Fiberfrax        | Heavy    | 430 |
| F-39 | 20 |                              | Heavy    | 485 |
| F-40 | 10 |                              | Light    | 320 |

TABLE II-continued

FLUX
Parts by Weight

| Example | Composition Code | ZnCl₂ | NH₄Cl | ZnCl₂·2NH₄Cl | ZnO | % NH₄Cl after melting |
|---|---|---|---|---|---|---|
| F-41 | 5 | " | | | Medium | 330 |
| F-42 | 2 | Long Staple Fiberfrax | | | Medium | 225 |
| F-43 | 10 | Fused Quartz Wool | | | Light | 340 |
| F-44 | 1 | " | | | Light | 250 |

Discussion of Selected Flux Tests

Test A (35% NH₄Cl Control)

| Composition of Flux A | Parts by weight |
|---|---|
| ZnCl₂ · 2NH₄Cl | 940 |
| Zinc oxide | 60 |

300 grams of Flux A were added to the solder bath at 750° F. The flux melted readily with active and violent boiling and with an initial evolution of voluminous clouds of white ammonium chloride smoke which eventually decreased as the melted flux lost a large percentage of its initial ammonium chloride content. One hour after the start, an addition of 100 grams of Flux A was made. Total charge to the solder bath was 400 grams of flux.

Flux A was spent at the end of 160 minutes.

When Flux A is heated, the zinc oxide reacts with some of the ammonium chloride, thereby reducing the amount of the ammonium chloride and increasing the amount of zinc chloride. After melting and reacting, the ammonium chloride is 35% of the total chlorides. Zinc ammonium chloride containing 35% of ammonium chloride has a melting point of 600° F. and a subliming point of 650° F. At 750° F. it is very thin, almost as thin as gasoline.

Test D (22% NH₄Cl Control)

| Composition of Flux D | Parts by weight |
|---|---|
| Powdered zinc chloride | 500 |
| ZnCl₂ · 2NH₄Cl | 500 |

300 grams of Flux D were added to the solder bath at 750° F. The flux melted readily with active boiling and with an initial evolution of voluminous clouds of white ammonium chloride smoke. However, the active boiling was not as violent as with the higher ammonium chloride Flux A and the voluminous clouds of white smoke decreased in half an hour to very heavy smoke. Immediately after melting Flux D contained 22% ammonium chloride on the total chlorides, as compared with 35% for Flux A.

One hour after the start, an addition of 100 grams of Flux D was made. Total charge to the solder bath was 400 grams of flux.

Flux D was spent at the end of 140 minutes.

Zinc ammonium chloride containing 22% of ammonium chloride has a melting point of 440° F. and a subliming point of 665° F. At 750° F. it also is very thin, almost as thin as gasoline.

Test E (21% NH₄Cl Control)

| Composition of Flux E | Parts by weight |
|---|---|
| Powdered zinc chloride | 100 |
| ZnCl₂ · 2NH₄Cl | 700 |
| Zinc oxide | 100 |

300 grams of Flux E were added to the solder bath at 750° F. The flux melted readily with active boiling and with an initial evolution of voluminous clouds of white ammonium chloride smoke. The active boiling was not as violent as it was with Flux A but it was more vigorous than Flux D, because of the evolution of NH₃ and H₂O (as steam) resulting from the reaction of zinc oxide with some of the ammonium chloride.

Immediately after melting Flux E contained 21% ammonium chloride on the total chlorides, slightly less than the 22% of Flux D. The melting of Flux E was complete in about 5 minutes and the boiling decreased. At this time the appearance of the melted Flux E was the same as Flux D.

One hour after the start, an addition of 100 grams of Flux E was made. Total charge to the solder bath was 400 grams of Flux.

Flux E was spent at the end of 135 minutes.

Zinc ammonium chloride containing 21% of ammonium chloride has a melting point of 445° F. and a subliming point of 668° F. At 750° F, it is very thin, almost as thin as gasoline is at room temperature.

Test F-2 (Composition Code LFA-1.5A)

| Composition of Flux F-2 | Parts by weight |
|---|---|
| ZnCl₂ · 2NH₄Cl | 926 |
| Zinc oxide | 59 |
| Chrysotile long fiber asbestos 3-R | 15 |

300 grams of Flux F-2 were added to the solder bath at 750° F. The flux melted rapidly within 5 minutes with vigorous boiling. After the reaction of the zinc oxide with some of the ammonium chloride has been completed the melted flux quieted down, but there were still bubbles of sublimed ammonium chloride rising from the hot surface of the solder to the top of the layer of melted flux. The flux contained 35% of ammonium chloride on the total weight of chlorides and thus had a melting point of 600° F. and a subliming point of 650° F.

The long fiber asbestos was dispersed throughout the layer of very thin melted flux in the form of a loose open textured, 3-dimensional floating blanket. The thin liquid is free to flow through this blanket because the volume of the actual fibers is less than 1.5% of the volume of the liquid flux. This fibrous blanket is effective in impeding the free thermal circulation of the thin melted flux and also in stopping the rapid circulatory motion of the melted flux which I have described previously The smoke rating taken ½ hour after the start was medium, a striking reduction from the voluminous smoke of control Flux A. One hour after the start an addition of 100 grams of Flux F-2 was made. A smoke rating taken 2½ hours after the start was very slight smoke.

Flux F-2 was spent at the end of 435 minutes.

This flux was a very satisfactory solder flux in every respect.

Test F-10 (Composition Code LFA-4.5)

| Composition of Flux F-10 | Parts by weight |
|---|---|
| $ZnCl_2 \cdot 2NH_4Cl$ | 926 |
| Zinc oxide | 59 |
| Chrysotile long fiber asbestos 3-R | 45 |

300 grams of Flux F-10 were added to the solder bath at 750° F. The flux melted very slowly with constant stirring. When melted there was practically no free liquid, but the roll was tinned.

The smoke rating taken ½ hour after the start was very light. One hour after the start, an addition of 100 grams of F-10 flux was stirred into the flux on the bath. Shortly thereafter the solder roll started "forming lead", which describes the formation of a layer of lead contaminated with lead oxide which forms on top of the clean pure solder layer on the solder roll when the flux is too heavy and so lays up too closely against the face of the solder roll. Stirring the flux would remove this "lead" and the roll would run satisfactorily for a few minutes before it started "forming lead" again.

It was evident from the outset that Flux F-10 had too much fiber and was not an effective solder flux, but I continued the test for a total time of two hours to see what it would do. By that time the "lead" formed quickly after each stirring and the solder roll showed traces of de-wetting. Flux F-10 contains (4.5%) of long fiber asbestos 3-R, which is enough to absorb practically all of the liquid.

Flux F-10 was not an effective flux.

Test F-11Z (Composition Code CHR3Z-0.5)

| Composition of Flux F-11Z | Parts by weight |
|---|---|
| $ZnCl_2 \cdot 2NH_4Cl$ | 926 |
| Zinc oxide | 59 |
| Chrysotile long fiber asbestos 3-Z | 5 |

300 grams of Flux F-11Z were added to the solder bath at 750° F. The flux melted rapidly within 5 minutes with vigorous boiling which helped to disperse the small amount of 3-Z asbestos fibers throughout the melted flux. Although the volume of the asbestos fibers is less than 0.5% of the volume of the melted flux, nevertheless the loose open textured fibrous blanket effectively impeded the normal circulation of thin melted flux.

The smoke rating taken ½ hour after the start was heavy and this decreased to slight 4 hours after the start. One hour after the start an addition of 100 grams of Flux F-11Z was made.

Flux F-11Z was spent at the end of 380 minutes.

Test F-16 (Composition Code AMS33-0.1)

| Composition of Flux F-16 | Parts by weight |
|---|---|
| $ZnCl_2 \cdot 2NH_4Cl$ | 940 |
| Zinc oxide | 60 |
| Amosite long fiber asbestos S-33 | 1 |

300 grams of Flux F-16 were added to the solder pot at 750° F. The flux melted rapidly within 5 minutes with vigorous boiling, The Amosite asbestos fibers appeared to react with the hot zinc ammonium chloride and swelled greatly, but they did not dissolve. There were not enough fibers and they were not springy enough to cover the entire surface of the melted flux, but they covered a large portion of the surface and changed the normal rapid circulation to a slow circulation which resulted in reduced smoke and substantially longer life than control Flux A which contained the same 35% ammonium chloride.

The smoke rating taken ½ hour after the start was heavy. One hour after the start an addition of 100 grams of flux F-16 was made.

Flux F-16 was spent at the end of 205 minutes.

Test F-19 (Composition Code CRS-80-1.0)

| Composition of Flux F-19 | Parts by weight |
|---|---|
| $ZnCl_2 \cdot 2NH_4Cl$ | 940 |
| Zinc oxide | 60 |
| Crocidolite long fiber asbestos S-80 | 10 |

300 grams of Flux F-19 were added to the solder pot at 750° F. The flux melted slowly but was melted within 10 minutes. During melting the flux boiled through the release of absorbed moisture and the usual zinc oxide reaction with ammonium chloride. The solder roll tinned immediately and stayed perfectly tinned throughout the test.

The smoke rating ½ hour after the start was light,—an outstanding reduction in smoking from the voluminous rating of control Flux A. One hour after the start an addition of 100 grams of Flux F-19 was made, making the total charge 400 grams.

Flux F-19 contained 1.0% of Crocidolite S-80 long fiber asbestos, which is a stiff, springy, acid resistant fiber. The 400 gram charge contained 4.0 grams of this Crocidolite fiber. Before starting this test I weighed out 4.0 grams of this fiber and placed it on the solder pot. I found that it completely covered the area with a fibrous blanket ½ inch thick, which is the same thickness of the 400 gram layer of melted flux. Thus the surface of the solder pot is covered with a fibrous blanket ½ inch thick; yet the volume of the actual Criociolite asbestos fibers is less than 1% of the volume of the melted flux.

Flux F-19 was spent at the end of 475 minutes.

This F-19 flux was a very satisfactory solder flux in every respect.

Test F-25 (Composition Code CARBON - 0.2)

| Composition of Flux F-25 | Parts by weight |
|---|---|
| $ZnCl_2 \cdot 2NH_4Cl$ | 940 |
| Zinc oxide | 60 |
| Carbon fiber tow | 2 |

300 grams of Flux F-25 were added to the solder pot at 750° F. The flux melted rapidly within 5 minutes with vigorous boiling. After the reaction of the zinc oxide with ammonium chloride the melted flux quieted down, but there were still bubbles of sublimed ammonium chloride rising through the very loose open textured blanket. The density of this carbon fiber tow is very low, 1.6 grams per cubic centimeter, the lowest fiber density of any of the fibers that I studied. The carbon fiber is remarkably strong, 160,000 psi, and was completely inert to the active zinc ammonium chloride flux at 750° F. The fiber diameter, although much greater than individual asbestos fibrils, was at 7.5 microns still in the micron range, where a little bit went a long way.

The smoke rating taken at the usual ½ hour after start was light, an excellent performance for such a small amount of fiber. One hour after the start an addition of 100 grams of F-25 flux was made.

F-25 flux was spent at the end of 270 minutes.

Test F-26 (Composition Code BFG-2.0)

| Composition of Flux F-26 | Parts by weight |
|---|---|
| ZnCl₂ . 2NH₄Cl | 940 |
| Zinc oxide | 60 |
| Baked Fiberglas, Corning No. 8670 | 20 |

300 grams of Flux F-26 were added to the solder pot at 750° F. The flux melted slowly in 15 minutes with some stirring, which is in the commercial range. The glass fibers completely filled all of the space occupied by the flux in the solder pot. The measured bulk density of these loose, springy, uncompressed baked Fiberglass fibers is 0.0273 grams per cc. The initial charge of 300 grams of Flux F-26 contains 6.0 grams of Fiberglass with an uncompressed volume of 220 cubic centimeters. The total volume of the solder pot with a ½ inch layer is 200 cc and with a 1 inch layer is 400 cc.

The melted flux is very thin and there is some vertical up-and-down motion through the open textured fibrous blanket. There is also some circulation and movement at the face of the rapidly rotating solder, roll, which brings fresh melted flux constantly to working area. The fibrous blanket acts like a wick to feed fresh flux to the solder roll when it is needed.

The smoke rating ½ hour after the start was medium. The final addition of 100 grams of flux F-26 was made 1 hour after the start.

Flux F-26 was spent at the end of 465 minutes.

This flux was highly satisfactory although it contained somewhat more fiber than needed. However, the baked Fiberglas is very cheap, since it is merely the glass fiber in ordinary rolls of Fiberglas insulation, baked at 800° F. to burn off the pink colored resin.

Test F-33 (Composition Code Pyrex - 0.1D)

| Composition of Flux F-33 | Parts by weight |
|---|---|
| Powdered zinc chloride | 500 |
| ZnCl₂ . 2NH₄Cl | 500 |
| Pyrex Fiberglas, Corning No. 3950 | 1 |

300 grams of Flux F-33 were added to the solder bath at 750° F. The flux melted readily with active boiling and for the first few minutes behaved just about the same as the control Flux D which had the same 22% of ammonium chloride. It should be remembered that Flux F-33 was identical with control Flux D, except that it contained 1 part per 1000 of a very high quality springy, open glass fiber which quickly formed an impeding blanket and stopped the rapid circulatory motion.

The smoke rating taken ½ hour after the start was medium, a big reduction from the control's rating of very heavy.

One hour after the start, an addition of 100 grams of F-33 Flux was made. Total charge to the solder bath was now 400 grams of flux.

Flux F-33 was spent at the end of 220 minutes.

This represents an increase of 57% in flux life from control D's 140 minutes, and is a remarkable demonstration of the effectiveness of my 3-dimensional undulating fibrous blanket in impeding the normal circulatory movement of the thin melted flux. I have searched the Dictionary to try to find words to describe the action of this insignificant amount of Pyrex glass fiber, and have concluded that since the fibers "float" half-submerged in the liquid and the fibrous blanket is free to move up and down,—and most importantly keep away from but close to the solder roll, the behavior of my inorganic fiber blanket can best be described as "undulating".

Test F-37 (Composition Code WRW-4.0)

| Composition of Flux F-37 | Parts by weight |
|---|---|
| ZnCl₂ . 2NH₄Cl | 940 |
| Zinc oxide | 60 |
| Washed rock wool, USG | 40 |

300 grams of Flux F-37 were added to the solder bath at 750° F. The flux melted slowly but readily with moderate boiling. The solder pot is rather full of clumps of washed rock wool, but there is plenty of thin melted flux around and underneath the clumps.

The smoke rating taken ½ hour from the start was very light. Apparently the clumps were trapping some of the sublimed ammonium chloride. There was essentially no apparent circulation, but there must have been some circulation of thin melted flux under the fibrous rock wool blanket, or else the solder roll would not have kept perfectly tinned, as it did.

One hour from the start 100 grams of Flux F-37 were added.

Flux F-37 was spent at the end of 490 minutes.

This was a highly satisfactory solder flux for high temperature solder baths. It takes more washed rock wool by weight than some other fibers to make an effective blanket; but, on the other hand, rock wool is very cheap and the washing process is simple and inexpensive.

Test F-39 (Composition Code WFF-2.0)

| Composition of Flux F-39 | Parts by weight |
|---|---|
| ZnCl₂ . 2NH₄Cl | 960 |
| Zinc oxide | 40 |
| Washed bulk Fiberfrax fibers | 20 |

300 grams of Flux F-39 were added to the solder bath at 750° F. The flux melted very slowly with only moderate boiling, but at the end of 15 minutes almost all, except a small island in the middle, was melted. However, there was no problem of tinning the solder roll, because flux which melted first was liquid and kept the roll clean and perfectly tinned. This slow melting is due to the heat insulating properties of the bulky Fiberfrax fibers It is not objectionable commercially because it moderates the violent boiling characteristic of control Flux A.

After melting there was thin clear liquid zinc ammonium chloride flux on the surface of the solder and through the ceramic fiber blanket, which covered the entire surface of the solder pot.

The smoke rating taken ½ hour from the start was heavy. Most of the smoke was coming from the side walls of the pot and from the thin melted flux which was turning over nicely at the face of the rotating roll. One hour from the start 100 grams of flux F-39 were added. Two hours after the start the smoke rating had dropped to very slight.

Flux F-39 was spent at the end of 485 minutes. This was a highly efficient solder flux for high temperature solder baths.

Test F-44 (Composite on Code QW-0.1)

| Composition of Flux F-44 | Parts by weight |
|---|---|
| $ZnCl_2 \cdot 2NH_4Cl$ | 940 |
| Zinc oxide | 60 |
| Fused quartz wool | 1 |

300 grams of Flux F-44 were added to the solder bath at 750° F. The flux melted readily within 10 minutes with the usual boiling. The small amount of fused quartz wool had a high volume because of its springiness and extremely low bulk density, and provided an effective blanket to impade the circulation of the thin melted zinc ammonium chloride flux.

The smoke rating taken ½ hour after the start was light. One hour from the start 100 grams of Flux F-44 were added. The solder roll was perfectly tinned and bright, fed by a supply of thin flux which wicked through the open textured fibrous blanket.

Flux F-44 was spent at the end of 250 minutes.

IDENTIFICATION OF INORGANIC FIBERS USED IN EXAMPLES

Chrysotile Asbestos - Grade 3-R

This long fiber chrysotile asbestos was obtained from Asbestos Corporation Limited, Thetford Mines, P.Q., Canada and meets the Canadian Standard 3-R Grade.

Chrysotile asbestos is a hydrous magnesium silicate, $3MgO \cdot 2SiO_2 \cdot 2H_2O$. The formula $Mg_{12}Si_8O_{20}(OH)_{16}$ is sometimes used to indicate the unit cell composition. Its specific gravity varies from 2.4 to 2.6, but 2.5 is the commonly used average figure Fiber diameter is 180 to 400 Angstroms, or 0.018 to 0.040 microns. This is the diameter of the individual fiber, or fibril as it is sometimes called. Most of the fibers in the commercial asbestos consist of bundles of these infinitely fine submicron dimeter fibers.

Chrysotile Asbestos - Grade 3-Z

This is a lower price grade of long fiber Chrysotile asbestos with less of the very long fibers than (Grade 3-R. It meets the Canadian Standard 3-Z.

Amosite Asbestos - Grade S-33

This is long fiber Amosite asbestos and was obtained from North American Asbestos Corporation, Chicago, Illinois. It is their GRADE S-33 AMOSITE FIBRE.

Amosite asbestos is a member of the fibrous Amphibole Mineral family, and is described as essentially a ferrous silicate in which a proportion of the iron is replaced by magnesium. Its chemical formula is:

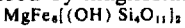

The fiber thickness of Amosite is 0.1 to 0.2 microns.

Amosite Asbestos - Grade D-11

This is another grade of Amosite asbestos, similar to the Grade S-33 and was obtained from North American Asbestos Corporation, Chicago, Illinois.

Crocidolite Asbestos - Grade S-80

This long fiber Crocidolite asbestos was obtained from North American Asbestos Corporation, Chicago, Illinois. It is their Grade S-80 Blue Asbestos Fibre.

Crocidolite asbestos is a member of the fibrous Amphibole Mineral family and is described as a sodium ferrosoferric silicate. Its chemical formula is:

It is more acid resistant than Chrysotile or Amosite asbestos. The fibers have great resilience, or springiness, and high specific volume.

The fiber thickness of Crocidolite is 0.1 to 0.2 microns. Fiber length: ¼ to ¾ inches.

Crocidolite Asbestos - Grade H

This is another grade of Crocidolite asbestos, similar to the Grade S-80 and was obtained from North American Asbestos Corporation, Chicago, Illinois. Fiber length: ⅛ inch to ½ inch.

Carbon Fiber Tow

The carbon fiber was a grade known as Tow and was obtained from Kurcha Chemical Industry Co., Ltd., Tokyo, Japan, with offices in New York City.

It assayed 99.5% carbon and had a density of 0.058 pounds per cubic inch. The carbon fiber had a diameter of 7.5 microns and high tensile strength, 160,000 psi.

The Kurcha Company treats this carbon fiber with a graphitization process to make a graphite fiber.

Baked Fiberglas, Corning 8670

I purchased at Sears Roebuck & Co. a large roll, 70 sq. ft. × 3 ½ inches thick, of Owens Corning Pink Fiberglas insulation 8670. It had been treated with a pink colored resin, which I was unable to remove with solvent, so I baked the Fiberglas for 2 hours at 800° F. The baking carbonized the resin and the oxidized most of it.

I could not measure it precisely, but it appeared to be 0.0003 inches (8 microns) in diameter. It was springy and very resilient. The fibers are extremely long.

Pyrex Fiberglas, Corning No. 3950

This was a very high grade of Pyrex Fiberglas used in chemical filtrations which I purchased from Will Scientific, Inc., Cambridge, Massachusetts.

Fiber diameters vary between 0.0002 and 0.0003 inch (5 microns and 7 ½ microns). The fibers are extremely long and there appears to be no "shot", or unfibrilized particles. I believe these fibers were "drawn glass filaments."

Rock Wool USG

I purchased a bag of US Gypsum's "blow-in" grade of rock wood insulation. It was in the form of large clumps and contained a high percentage of "shot" or unfibrilized particles. Apparently it was made by the blown process. Rock wool is sometimes called mineral wool.

According to the literature the fiber diameter of rock wool is 1 to 22 microns.

Washed Rock Wool USG

In order to remove some of the shot, I washed the commercial US Gypsum rock wool insulation in a Waring blender and strained in a sieve under running water. I then dried the wet rock wool for two hours at 400° F.

Although this removed a large amount of shot, there was a great deal left. An advantage was that the Waring blender broke up the large clumps of rock wool into smaller clumps the size of a bean, and these dispersed nicely in my solder flux compositions.

Washed Bulk Fiberfrax

I purchased the washed bulk Fiberfrax fiber No. 3800, from the Carborundum Company, Niagara Falls, New York. The washing process removes most of the unfiberized particles.

Fiberfrax is an alumina-silica ceramic fiber with high resiliency and low bulk density. Mean diameter is 2 microns. Length of fiber ranges from shorts to 1 ½ inches.

Long Staple Fiberfrax

Long staple Fiberfrax, No. 3753, is an alumina-silica ceramic fiber with average length of 2 to 3 inches and a mean diameter of 5 to 6 microns. It has high resiliency and very low bulk density.

Fused Quartz Wool Fibers

I purchased the pure fused quartz wood fiber from Thermal American Fused Quartz Co., Montville, New Jersey. The fib are extremely long, essentially continuous, with a diameter of 6 microns. There is not evidence of any unfiberized particles and this is confirmed by the almost unbelievable loose, springy bulk density of 0.003 grams per cubic centimeter.

However, with a small amount of pressure the quartz wool can be compressed ten times to a bulk density of 0.03 grams per cubic centimeter.

I have also discovered an extremely simple but highly effective formulating technology which greatly decreases the rate of loss of ammonium chloride from a melted zinc-ammonium chloride flux system by controlling the viscosity of the melted flux by means of viscosity thickening agents. It is so simple that once the secret is known, it is easy to formulate and, as my examples illustrate, it permits a very wide choice of viscosity thickening agents to use in my formulating technology. The usable viscosity thickening agents have many things in common. They must be inert or partially inert to the extremely active zinc-ammonium chloride melted solder flux at 750° F. Since ammonium chloride dissociates into HCl and $NH_3$ much below 750° F. and is partially held in solution in the zinc chloride melt, the chemical activity is amazing. In addition the ultimate particle size must be in the micron or submicron range below about 10 microns in diameter.

In the following examples I describe the performance of my new solder flux compositions containing various proportions of various viscosity thickening ingredients and compare them with control fluxes.

The various solder fluxes were tested under conditions that duplicated commercial conditions as closely as possible. In these tests a roll solder bath was used that was made to duplicate a typical commercial roll solder bath in every detail except for the width of the bath and of the roll.

Specifically, the solder bath used in all of the following tests comprises a thick walled metal tank 10 inches long, 6 ¼ inches wide and 4 inches deep. A solder roll 6 inches long and 4 inches in diameter was mounted across the tank with its center line equidistant between the ends and 2 ½ inches above the bottom of the tank. The tank was filled with a quantity of 2-98 solder sufficient to maintain the level of the molten solder at the center line of the roll (about 35 pounds). The tank is gas heated and thermostatically controlled to maintain the temperature of the solder to within 5° F.± of the indicated temperature. The roll was rotated at 120 r.p.m.

In each test, the flux was placed on top of the molten solder in that portion of the tank where the rotating roll re-entered the solder an area 3 inches by 6 ¼ inches. The flux in each instance was stirred once each hour. In every test the flux was considered to be spent as soon as noticeable areas on the rotating roll failed to be wetted by the molten solder. The test results were reproducible to less than fifteen minutes and the test results correlated very well with field results under commercial conditions.

TABLE III

| | | FLUX Parts by Weight | | | |
|---|---|---|---|---|---|
| Example | Composition Code | $ZnCl_2$ | $ZnCl_2$ 2$NH_4Cl$ | ZnO | % $NH_4Cl$ after melting |
| X | Control X | | 926 | 59 | 35 |
| Y | Control Y | 500 | 500 | | 22 |
| Z | Control Z | 100 | 700 | 100 | 21 |
| V-1 | A-0.5 | | 926 | 59 | 35 |
| V-2 | A-1.0 | | 926 | 59 | 35 |
| V-3 | A-1.5 | | 926 | 59 | 35 |
| V-4 | A-2.2 | | 926 | 59 | 35 |
| V-5 | A-2.6 | | 92.6 | 59 | 35 |
| V-6 | A-3.0 | | 926 | 59 | 35 |
| V-7 | A-4.5 | | 926 | 59 | 35 |
| V-8 | A-6.0 | | 926 | 59 | 35 |
| V-9 | A-7.5 | | 926 | 59 | 35 |
| V-10 | A-10.0 | | 926 | 59 | 35 |
| V-11 | A-13.0 | | 926 | 59 | 35 |
| V-12 | AF6D-0.3 | | 926 | 59 | 35 |
| V-13 | AF6D-1.5 | | 926 | 59 | 35 |
| V-14 | C-0.5 | | 926 | 59 | 35 |
| V-15 | C-1.0 | | 926 | 59 | 35 |
| V-16 | C-1.3 | | 926 | 59 | 35 |
| V-17 | C-2.0 | | 926 | 59 | 35 |
| V-18 | C-3.0 | | 926 | 59 | 35 |
| V-19 | C-4.5 | | 926 | 59 | 35 |
| V-20 | S-0.5 | | 926 | 59 | 35 |
| V-21 | S-1.0 | | 926 | 59 | 35 |
| V-22 | S-2.0 | | 926 | 59 | 35 |
| V-23 | S-4.0 | | 926 | 59 | 35 |
| V-24 | S-6.0 | | 926 | 59 | 35 |
| V-25 | AEROSIL - 1.5 | | 926 | 59 | 35 |

TABLE III-continued

FLUX
Parts by Weight

| Example | Composition Code | $ZnCl_2$ | $ZnCl_2 \cdot 2NH_4Cl$ | $ZnO$ | % $NH_4Cl$ after melting |
|---|---|---|---|---|---|
| V-26 | AEROSIL - 3.0 | | 926 | 59 | 35 |

VISCOSITY THICKENERS
Parts by Weight

| Example | | | Turn-over Rating 1½ hrs. after Start | Smoke ½ hr. after Start | Flux life minutes |
|---|---|---|---|---|---|
| X | | | Complete | Volum. | 160 |
| Y | | | Complete | V. heavy | 140 |
| Z | | | Complete | V. heavy | 135 |
| V-1 | 5 | Fine Asbestos Filler No. 7-TS | 2 inch | V. heavy | 220 |
| V-2 | 10 | | 1 inch | V. heavy | 270 |
| V-3 | 15 | | 1 inch | Heavy | 330 |
| V-4 | 22 | | 1 inch | Medium | 425 |
| V-5 | 26 | | 1 inch | Medium | 430 |
| V-6 | 30 | | 1 inch | Medium | 420 |
| V-7 | 45 | | ¾ inch | Medium | 400 |
| V-8 | 60 | | ½ inch | Light | 470 |
| V-9 | 75 | | ¼ inch | Light | 440 |
| V-10 | 100 | | ¼ inch | Light | 520 |
| V-11 | 130 | " | Too heavy to use commercially. | | |
| V-12 | 3 | Fine Asbestos Filler No. 6-D | 2 inch | V. heavy | 210 |
| V-13 | 15 | " | ¾ inch | Medium | 340 |
| V-14 | 5 | CAB-O-SIL Silica M-5 | Complete | V. heavy | 210 |
| V-15 | 10 | | Complete | V. heavy | 235 |
| V-16 | 13 | | 1½ inch | Heavy | 310 |
| V-17 | 20 | | ½ inch | Medium | 340 |
| V-18 | 30 | | 0 | Medium | 500 |
| V-19 | 45 | " | Too heavy to use commercially. Would not melt properly. | | |
| V-20 | 5 | SANTOCEL Silica - C | Complete | V. heavy | 200 |
| V-21 | 10 | | 1½ inch | Heavy | 260 |
| V-22 | 20 | | ½ inch | Medium | 385 |
| V-23 | 40 | | 0 | Light | 580 |
| V-24 | 60 | " | Too heavy. Would not melt. | | |
| V-25 | 15 | DEQUSSA AEROSIL 2491/380 | Complete | Heavy | 210 |
| V-26 | 30 | " | 1 inch | Medium | 390 |

FLUX
Parts by Weight

| Example | Composition Code | $ZnCl_2$ | $ZnCl_2 \cdot 2NH_4Cl$ | $ZnO$ | % $NH_4Cl$ after melting |
|---|---|---|---|---|---|
| V-27 | SYL-0.5 | | 926 | 59 | 35 |
| V-28 | SYL-2.0 | | 926 | 59 | 35 |
| V-29 | QUSO-1.5 | | 926 | 59 | 35 |
| V-30 | QUSO-3.0 | | 926 | 59 | 35 |
| V-31 | 5M SILICA-12.0 | | | | |
| V-32 | 5M SILICA-16.0 | | 926 | 35 | |
| V-33 | 5M SILICA-20.0 | | 926 | 59 | 35 |
| V-34 | 10M SILICA | | 926 | 59 | 35 |
| V-35 | MINUGEL-8.0 | | 926 | 59 | 35 |
| V-36 | CaSil-6.0 | | 926 | 59 | 35 |
| V-37 | BMFF-8.0 | | 926 | 59 | 35 |
| V-38 | BMFF-20.0 | | 926 | 59 | 35 |
| V-39 | ALON-3.0 | | 926 | 59 | 35 |
| V-40 | ALON-5.0B | 500 | 500 | | 22 |
| V-41 | BAYMAL-7.5 | | 926 | 59 | 35 |
| V-42 | HT BAYMAL-7.5 | | 926 | 59 | 35 |
| V-43 | CABOT I-4.0 | | 926 | 59 | 35 |
| V-44 | CABOT I-8.0 | | 926 | 59 | 35 |
| V-45 | CABOT I-7.5B | 500 | 500 | | 22 |

VISCOSITY THICKENERS
Parts by Weight

| Example | | | Turn-over Rating 1½ hrs. after Start | Smoke ½ hr. after Start | Flux life minutes |
|---|---|---|---|---|---|
| V-27 | 5 | SYLOID Silica No. 244 | Complete | V.Heavy | 195 |
| V-28 | 20 | " | ½ inch | Light | 375 |
| V-29 | 15 | QUSO Microfine Silica F-22 | 1 inch | V.Heavy | 340 |
| V-30 | 30 | " | ¼ inch | Medium | 505 |
| V-31 | 120 | 5-MICRON Silica | 1 inch | Medium | 300 |
| V-32 | 160 | | ½ inch | Medium | 300 |
| V-33 | 200 | " | 0 | Light | Alls |
| V-34 | 200 | 10-MICRON Silica | 1 inch | Medium | 280 |
| V-35 | 80 | MIN-U-GEL No. 200 Attapulgite | 1 inch | Heavy | 315 |
| V-36 | 60 | MICRO-CEL Hydrous Calcium Silicate | ¼ inch | Light | 365 |

TABLE III-continued

| Example | Composition Code | ZnCl$_2$ | FLUX Parts by Weight ZnCl$_2$ 2NH$_4$Cl | ZnO | % NH$_4$Cl after melting |
|---|---|---|---|---|---|
| V-37 | 80 | FIBERFRAX Ball Milled Ceramic Fiber | Complete | Volum. | 150 |
| V-38 | 200 | '' | 1½ inch | Medium | 260 |
| V-39 | 30 | Cabot's ALON fumed alumina | 1 inch | Heavy | 270 |
| V-40 | 50 | '' | ¾ inch | Light | 285 |
| V-41 | 75 | BAYMAL Alumina, untreated | 1½ inch | V.Heavy | 210 |
| V-42 | 75 | BAYMAL heated above 2000° F. | 1 inch | Medium | 305 |
| V-43 | 40 | Cabot's CAB-O-T I Fumed TiO$_2$ | Complete | Volum. | 135 |
| V-44 | 80 | | 1 inch | Medium | 320 |
| V-45 | 75 | '' | ½ inch | Light | 360 |

DESCRIPTION OF SELECTED FLUX TESTS

Test X (35% NH$_4$Cl Control)

| Composition of Flux X | Parts by weight |
|---|---|
| ZnCl$_2$ . 2NH$_4$Cl | 926 |
| Zinc oxide | 59 |

300 grams of Flux X were added to the solder bath at 750° F. The flux melted readily with active and violent boiling and with an initial evolution of voluminous clouds of white ammonium chloride smoke, which eventually decreased as the melted flux lost a large percentage of its initial ammonium chloride content. One hour after the start, an addition of 100 grams of Flux X was made. Total charge to the solder bath was 400 grams of flux.

Flux X was spent at the end of 160 minutes.

When Flux X is heated, the zinc oxide reacts with some of the ammonium chloride, thereby reducing the amount of the ammonium chloride and increasing the amount of zinc chloride. After melting and reacting, the ammonium chloride is 35% of the total chlorides. Zinc ammonium chloride containing 35% of ammonium chloride has a melting point of 600° F. and a boiling point of 650° F. At 750° F. it is very thin, almost as thin as gasoline.

Test Y (22% NH$_4$Cl Control)

| Composition of Flux Y | Parts by weight |
|---|---|
| Powdered zinc chloride | 500 |
| ZnCl$_2$ . 2NH$_4$Cl | 500 |

300 grams of Flux Y were added to the solder bath at 750° F. The flux melted readily with active boiling and with an initial evolution of voluminous clouds of white ammonium chloride smoke. However, the active boiling was not as violent as with the higher ammonium chloride Flux X and the voluminous clouds of white smoke decreased in half an hour to very heavy smoke. Immediately after melting Flux Y contained 22% ammonium chloride on the total chlorides, as compared with 35% for Flux X.

One hour after the start, an addition of 100 grams of Flux Y was made. Total charge to the solder bath was 400 grams of flux.

Flux Y was spent at the end of 140 minutes.

Zinc ammonium chloride containing 22% of ammonium chloride has a melting point of 440° F. and a boiling point of 665° F. At 750° F. it also is very thin, almost as thin as gasoline.

Test Z (21% NH$_4$Cl Control)

| Composition of Flux Z | Parts by weight |
|---|---|
| Powdered zinc chloride | 100 |
| ZnCl$_2$ . 2NH$_4$Cl | 700 |
| Zinc oxide | 100 |

300 grams of Flux Z were added to the solder bath at 750° F. The flux melted readily with active boiling and with an initial evolution of voluminous clouds of white ammonium chloride smoke. The active boiling was not as violent as it was with Flux X but it was more vigorous than Flux Y, because of the evolution of NH$_3$ and H$_2$O (as steam) resulting from the reaction of zinc oxide with some of the ammonium chloride.

Immediately after melting Flux Z contained 21% ammonium chloride on the total chlorides, slightly less than the 22% of Flux Y. The melting of Flux Z was complete in about five minutes and the boiling decreased. At this time the appearance of the melted Flux Z was the same as Flux Y.

One hour after the start, an addition of 100 grams of Flux Z was made. Total charge to the solder bath was 400 grams of Flux.

Flux Z was spent at the end of 135 minutes.

Zinc ammonium chloride containing 21% of ammonium chloride has a melting point of 445° F. and a subliming point of 668° F. At 750° F. it is very thin, almost as thin as gasoline is at room temperature.

Test V-6 (Composition Code A-3)

| Composition of Flux V-6 | Parts by weight |
|---|---|
| ZnCl$_2$ . 2NH$_4$Cl | 926 |
| Zinc oxide | 59 |
| Fine Chrysotile asbestos Filler No. 7-TS | 30 |

300 grams of Flux V-6 were added to the solder bath at 750° F. The flux melted somewhat slowly but was completely melted within 10 minutes. During this melting period the zinc oxide reacted with some of the ammonium chloride to form zinc chloride and release H$_2$O and NH$_3$ as gases at this high temperature, producing active boiling and stirring of the melted flux. During this period the fine asbestos filler No. 7-TS which had been mixed thoroughly with the solder flux crystals were dispersed throughout the melted flux, producing an immediate increase in viscosity. In a few minutes the viscosity increased somewhat, apparently due to the swelling of the submicron fine asbestos fibers by the strong hot active zinc ammonium chloride flux.

The viscosity of the melted V-6 Flux appeared to be about the same as a 40 viscosity motor oil, many times thicker than control Flux X, which had the same 35% ammonium chloride after melting and reacting. However, the effect of this viscosity increase on the motion of the liquid on the solder bath was much more striking than I would have expected.

Likewise, the increased viscosity greatly reduced the rate of evolution of white ammonium chloride smoke from the voluminous rating of control Flux X to medium with V-6 Flux. This rating is taken ½ hour after start,— that is after placing the initial charge of 300 grams on the bare metal surface of the solder pot.

Test V-8 (Composition Code A-6.0)

| Composition of Flux V-8 | Parts by weight |
|---|---|
| $ZnCl_2 . 2NH_4Cl$ | 926 |
| Zinc oxide | 59 |
| Fine Chrysotile asbestos filler No. 7-TS | 60 |

300 grams of Flux V-8 were added to the solder bath at 750° F. The flux melted slowly in about 10 minutes. During this period there was active boiling and stirring of the melted flux by the released $H_2O$ and $NH_3$ gases. This assisted in dispersing the fine asbestos filler throughout the melted flux which had an immediate large increase in viscosity. The viscosity of melted Flux V-8 at 750° F. was much greater than that of melted Flux V-6 at the same temperature. It appeared to be about the same as a heavy oil at room temperature.

The heavy viscosity reduced the smoke rating taken ½ hour after the start for Flux V-8 to light as compared to voluminous for control Flux X with the same 35% ammonium clhoride.

The turn-over of the melted flux was slow right from the start. One and one-half hours after the start the turn-over rating for Flux V-8 was ½ inch.

One hour after the start, an addition of 100 grams of Flux V-8 was made. Total charge to the solder bath was 400 grams of flux.

Flux V-8 was spent at the end of 470 minutes.

This is about three times the flux life of the control X which has the same zince ammonium chloride composition but which had a flux life of only 160 minutes. I attribute this much longer life to the fact that the increased viscosity of Flux V-8 stops the normal circulatory motion of the very thin melted zinc ammonium chloride basic flux but permits a limited turn-over motion at the interface of the rotating solder roll and the bath of melted flux. This greatly reduces the loss by volatilization of the ammonium chloride active agent. Ammonium chloride reacts with lead oxide to form lead chloride and with tin oxide to form tin chloride, thus removing the large quantity of oxides produced on the solder roll and solder bath at 750° F.

Even though all loss of ammonium chloride by volatilization were eliminated, the flux would eventually become spent. My many experiments show that with a 400 gram charge on my small solder pot operating at 750° F. with 2-98 solder I have been unable to make a commercially usable flux with a life of more than 500 to 580 minutes. From this data and commercial experience in can plants, I have calculated that on my small solder pot about 60 grams of ammonium chloride in the 400 gram charge are used up during the life of the flux to form about 150 grams of lead chloride. Lead oxidizes very rapidly at 750° F., much more rapidly than tin, and since 2-98 solder contains only 2% tin, there is very little tin chloride formed. The lead and tin chlorides become mixed with the melted zinc ammonium chloride. This is evidenced by the fact that a high ammonium chloride content flux at 750° F. has a specific gravity of 2.0. After running several hours on the solder pot it loses some ammonium chloride and picks up enough lead chloride to voice the 750° F. specific gravity to 3.0.

My regular smoke rating is taken ½ hour after the start when all the fluxes have a high percentage of ammonium chloride and there has not been enough time to form much lead chloride. It is interesting to note that Flux V-8, containing about 6% of the fine asbestos filler No. 7-TS, showed further reduction in smoking as the test went on. One half hour from the start Flux V-8's smoke rating was light smoke. At 2 hours it was very light smoke and at 3 ½ hours it was very slight smoke. At 5 hours there was practically no smoke and the turn-over rating was ¼ inch turn-over, barely moving.

This is interesting because it points up the manner in which I have taken advantage of the high rate of shear occurring as the face of the rapidly rotating solder roll passes down through the layer of melted flux and into the molten solder underneath. The linear velocity of the face of the solder roll at 120 r.p.m. is 25 inches per second. This shear stirring reduces the viscosity of the flux near the solder roll. By maintaining the turn-over motion of the melted flux it keeps the flux hot,— at or close to the solder bath and solder roll temperature of 750° F.

My next example shows the effect of too much viscosity thickening ingredient.

Test V-11 (Composition Code A-13.0)

| Composition of Flux V-11 | Parts by weight |
|---|---|
| $ZnCl_2 . 2NH_4Cl$ | 926 |
| Zinc oxide | 59 |
| Fine Chrysotile asbestos filler No. 7-TS | 130 |

300 grams of Flux V-11 were added to the solder bath at 750° F. The flux melted very slowly and required stirring during the melting period. The evolution of $H_2O$ and $NH_3$ gases assisted in the melting. After melting the viscosity of the flux was very heavy. The smoke rating taken ½ hour after the start was light, which is the same rating as Flux V-8 which contained only 6% of the fine asbestos filler. This is explained by the fact that there always is some smoke adjacent to the surface of the solder roll where the flux is stirred and by the fact that the steel sides of the solder pot are frequently about 850° F. when the solder is at 750° F. Flux V-11 contained 35% ammonium chloride having a subliming point of 650° F. With the steel side walls of the solder pot so hot, some of the sublimed ammonium chloride just had to get out into the atmosphere.

One hour after the start, an addition of 100 grams of V-11 Flux was stirred into the heavy viscosity flux. Total charge to the solder bath was 400 grams of flux.

The turn-over of the melted flux was very slow right from the start and the flux required stirring every half hour. One and one-half hours after the start the turn-over rating for V-11 Flux was 0; but there was barely enough turn-over providing fresh flux to keep the solder roll tinned. The smoke was now very slight. Although I realized that this flux was too heavy to use commercially I kept the test going by stirring every 15 minutes or oftener and it ran for 480 minutes at which time the consumption of ammonium chloride and production of lead chloride turned the flux into a thick pastry mass.

Test V-30 (Composition Code CUSO-3.0)

| Composition of Flux V-30 | Parts by weight |
|---|---|
| $ZnCl_2 . 2NH_4Cl$ | 926 |
| Zinc oxide | 59 |
| QUSO micro fine silica F-22 | 30 |

300 grams of Flux V-30 were added to the solder pot at 750° F. The flux melted very slowly in about 20 minutes with a little stirring but the solder roll stayed perfectly tinned during the slow melting period. There was always a layer of melted flux turning over next to the face of the solder roll. The melted flux had a very heavy viscosity but it looked good. The smoke rating ½ hour after the start was medium, somewhat higher than I would have expected from this highly viscous flux. This might have been due to the fact that the rating was taken only 10 minutes after the last of the crystals had melted or it might have been due to the burners being on the UP stage and the steel sides of the solder pot being hotter than average. One hour after the start, an addition 100 grams was made.

The turn-over rating taken 1 ½ hours after the start was ¼inch. At that time the smoke was very light. An hour later there was very little turn-over, but two hours afterwards,- that is, 4 ½ hours after the start the melted flux had thinned appreciably, although it was still highly viscous. The solder roll was receiving a steady supply of fresh flux, aided by the standard practice of stirring once an hour.

Flux V-30 was spent at the end of 505 minutes.

Test V-41 (Composition Code Baymal - 7.5)

| Composition of Flux V-41 | Parts by weight |
|---|---|
| $ZnCl_2 . 2NH_4Cl$ | 926 |
| Zinc oxide | 59 |
| Baymal alumina untreated | 75 |

300 grams of Flux V-41 were added to the solder pot at 750° F. The flux melted rapidly with active and violent boiling and with the evolution of voluminous clouds of smoke which looked and smelled different from the smoke evolved from all my other examples. The smoke had an acid, acrid, choking odor while the smoke from control X Flux is non-choking and smells distinctly of ammonia. There also was vigorous fine boiling and it appeared that the Baymal alumina was reacting with the melted zincammonium chloride.

One half hour after the start the smoke rating was very heavy and there was slow but complete circulation of the melted flux on the solder bath. One hour after the start an addition of 100 grams of Flux V-41 was made.

The turn-over rating for Flux V-41, taken 1 ½ hours after the start was 1 ½ inches. At that time the smoke had decreased to light.

Flux V-41 was spent at the end of 210 minutes.

The literature on Baymal alumina states that it is boehmite, A100H, and that contains adsorbed acetate ions and is not acid resistant. I suspect that most of the 7.5% of Baymal reacted with the hot zinc-ammonium chloride, but that enough of it remained to show a substantial improvement over control X. The intense initial evolution of acid fumes would be objectionable, but with excellent ventilating hoods might be tolerated.

Test V-42 (Composition Code HT Baymal-7.5)

| Composition of Flux V-42 | Parts by weight |
|---|---|
| $ZnCl_2 . 2NH_4Cl$ | 926 |
| Zinc oxide | 59 |
| Baymal alumina, heated above 2000°F. | 75 |

300 grams of Flux V-42 were added to the solder pot at 750° F. The flux melted readily with the usual active boiling and stirring produced the evolving $NH_3$ and $H_2O$ gases. The smoke smelled of ammonia and looked the same as other fluxes, such as Flux V-6. The behavior of the melted flux and the nature of the smoke was entirely different from Flux V-41 which was tested at the same time on a duplicate solder pot.

According to the suppliers literature, heating Baymal A100H to 1000°–1100° C. converts it to alpha alumina which is highly acid resistant. The heating to much lower temperatures is sufficient to drive off the adsorbed acetic acid.

One-half hour after the start the smoke rating for Flux V-42 was medium. One hour after the start an addition of 100 grams of Flux V-42 was made.

The turn-over rating taken for Flux V-42 1 ½ hours after the start was one inch and the smoke was then very light.

Flux V-42 was spent at the end of 305 minutes.

Test V-45 (Composition Code CABOTI-7.5B)

| Composition of Flux V-45 | Parts by weight |
|---|---|
| Powdered zinc chloride | 500 |
| $ZnCl_2 . 2NH_4Cl$ | 500 |
| Cabot's CAB-O-T 1 fumed $TiO_2$ | 75 |

This flux after melting contains 22% ammonium chloride, the same as control Flux Y.

300 grams of Flux V-45 were added to the solder pot at 750° F. The flux melted slowly with the usual active boiling and stirring which helped to disperse the extremely fine fumed titanium dioxide throughout the melted flux.

The smoke rating taken ½ hour after the start was light. At that time the melted flux was somewhat pasty,— perhaps thixotropic but it was not too heavy since it had a one inch turnover. One hour after the start, an addition of 100 grams of Flux V-45 was made.

The usual turn-over rating taken 1 ½ hours after the start was ½ inch, although the melted flux was distinctly pseudo-plastic or thixotropic. At that time the smoke had decreased to slight. The high rate of shear at the solder roll face kept the first ½ inch of melted flux fluid although the rest of it had set up into a soft gel.

Flux V-45 was spent at the end of 360 minutes.

This compares with a 140 minute flux life for control Flux Y which had the same 22% ammonium chloride flux composition. In general a flux with 22% ammonium chloride has a shorter flux life than one with 35%.

IDENTIFICATION OF VISCOSITY THICKENING INGREDIENTS

Fine Asbestos Filler No. 7 -TS

This is Chrysotile asbestos fibrous mineral filler, Canadian Grade 7-TS, obtained from Asbestos Corporation, Ltd., Thetford Mines, Quebec, Canada and known as their KB-795-TS. Chrysotile asbestos is a hydrous magnesium silicate, $Mg_{12}Si_8O_{20}(CH)_{16}$ Fine Asbestos Filler No. 6-D This is Chrysotile asbestos fibrous mineral filler, Canadian Grade 6-D, obtained from Asbestos Corporation, Ltd., Thetford Mines, Quebec, Canada and known as their KB-653-6-D. This Grade 6-D is a slightly more expensive grade than the Grade 7-TS and contains some somewhat longer fine fibers. It is, however, also a filler grade and not a spinning grade of asbestos. Both grades are extremely fine, 180 to 400 Angstroms in fiber diameter, and although very short fibers are nevertheless 5000 Angstroms in length, or longer.

The specific gravity of Chrysotile asbestos varies, but is about 2.5.

CAB-O-SIL SILICA M-5

CAB-O-SIL is a submicroscopic collodial silica produced by the hydrolysis of silicon tetrachloride at 1100° C. which is generally classified as a "fumed" silica. It is manufactured by Cabot Corporation, Boston, Massachusetts.

The M-5 grade has a particle size of 0.012 microns, a bulk density of 2.3 pounds per cubic foot and a specific gravity of 2.2.

SANTOCEL SILICA C

SANTOCEL C is a microfine silica acrogel manufactured by Monsanto Company, St. Louis, Missouri. It occurs in the form of agglomerates having a diameter of about 5 microns with the ultimate particle size about 0.02 micron. The bulk density is about 6.7 pounds per cubic foot.

DEGUSSA AEROSIL 2491/380

AEROSIL is a submicroscopic pyrogenic silica produced by flame hydrolysis of silicon tetrachloride in a gaseous environment of 1100° C. It is manufactured by Degussa, Inc., Kearny, New Jersey. The 2491/380 grade has a particle size of 3 to 15 millimicrons and a bulk density of 3 pounds per cubic foot.

SYLOID SILICA No. 244

SYLOID No 244 is a low aerogel size acrogel silica made by W. R. Grace & Co., Baltimore, Maryland. It has high oil absorption properties and an average particle size of 3 microns.

QUSO Microfine Silica F-22

QUSO is a microfine precipitated silica made by Philadelphia Quartz Company, Philadelphia, Pennsylvania. The ultimate particle is extremely fine,- 12 millimicrons in diameter but they agglomerate into clusters with an agglomerate diameter of 1.3 microns. These agglomerates can be subdivided with (moderate) energy. Bulk density is 4 pounds per cubic foot.

5-MICRON and 10-MICRON SILICA

These are fine grades of silica with the trade name, MINUSIL, made by Pennsylvania Glass Sand Corp., Pittsburgh, Pennsylvania.

MIN-U-GEL No. 200 Attapulgite

MIN-U-GEL No. 200 is a fine grade of colloidal attapulgite clay,- hydrous magnesium aluminum silicate. It analyzes 59% silicon dioxide, 11% aluminum oxide, 11% magnesium oxide and has a loss on ignition of 11% Specific gravity is 2.4. MIN-U-GEL is made by Floridin Company, Pittsburgh, Pennsylvania. The particle size is not known but 95% passes through a 325 mesh screen.

MICRO-CEL Hydrous Calcium Silicate

MICRO-CEL is a synthetic, hydrous calcium silicate produced by Johns-Manville, New York, N.Y. it analyses about 50% silicon dioxide and has a specific gravity of 2.25 and a bulk density of about 10 pounds per cubic foot. The average particle size is about 3 microns.

FIBERFRAX Ball Milled Ceramic Fiber

FIBERFRAX ceramic fiber is an alumina-silica synthetic fiber manufactured by The Carborundum Company, Niagara Falls, New York. Some of the FIBERFRAX fibers are chopped and then ball milled to form a fine white powder. The mean diameter of these tiny fibers is 2 microns and the fiber lengths range from 12 microns to 100 microns.

Cabot's ALON Fumed Alumina

ALON is a fumed alumina made by the hydrolysis of aluminum chloride in a flame process, which produces a material of extremely small particle diameter. The average particle diameter is 0.03 micron. Its specific gravity is 3.6 and loose bulk density 2 pounds per cubic foot. Alon is manufactured by Cabot Corporation, Boston, Massachusetts.

Baymal Alumina, Untreated

Baymal colloidal alumina is a white powder, consisting of clusters of minute fibrils of boehmite (A100H) alumina. The surface of the fibrils is modified by adsorbed acetate ions, and a bottle of Baymal smells strongly of acetic acid. It is manufactured by E. I. duPont de Nemours & Co., Wilmington, Delaware. The diameter of the fibrils is reported as 77 Angstroms with the length 25 to 50 times diameter.

Baymal heated above 2000° F.

Heating Baymal colloidal alumina above 2000° F. drives off the adsorbed acetic acid and converts the boehmite (A100H) alumina to alpha alumina ($Al_2O_3$). It is still colloidal in particle size, but now has high acid resistance. There is no difference in appearance between heat treated Baymal and non-heat treated Baymal.

Cabot's CAB-O-T I fumed $TiO_2$.

CAB-O-T I is an extremely fine fumed non-pigmentary titanium dioxide made by flame hydrolysis of titanium tetrachloride. It has an average particle diameter of 0.03 micron, a specific gravity of 3.9 and a loose bulk density of 4 pounds per cubic foot.

I claim:

1. A solder flux of the type adapted to be used on high temperature solder baths, said flux consisting essentially of a fusible fluxing composition consisting essentially of a zinc-ammonium chloride composition and an effective amount in the order of at least about 0.1% by weight of the weight of the fusible fluxing composition of inorganic fibers.

2. A solder flux as claimed in claim 1 wherein said inorganic fibers are selected from the group consisting of asbestos, glass fiber, mineral fiber (so-called rock wool), ceramic alumina-silica fiber, fused quartz fiber, carbon fiber and graphite fiber.

3. A solder flux as claimed in claim 1 wherein said inorganic fibers are inert or partically inert at the temperature of use in the presence of the molten solder and the melted flux.

4. A solder flux of the type adapted to be used on high temperature solder baths, said flux consisting essentially of a fusible fluxing composition consisting essentially of a zinc-ammonium chloride composition and an effective amount in the order of at least about 0.3% by weight of the weight of the fusible fluxing composition of a viscosity thickening ingredient selected from a group consisting of micron-sized particles of fine asbestos, non-fibrous metal silicates, silica, alumina, alumina-silica ceramic and titanium dioxide.

5. A solder flux as claimed in claim 4 wherein the particles have an average minor dimension of less than about 10 microns.

6. In a solder flux of the type adapted to be used on high temperature solder baths wherein the active fluxing ingredient is a fusible zinc-ammonium chloride composition, the improvement which consists of the incorporation therein of an amount effective to impede the normal circulation of the molten fused active fluxing ingredient at the operating temperature of said bath, of a material which is at least partially inert in said molten fused fluxing ingredient and which has an average minor dimension of less than about 10 microns.

7. A solder flux as claimed in claim 6 wherein the inert material is an inorganic fiber present in an amount in the order of at least 0.1 per cent by weight of the weight of the fusible fluxing composition.

8. A solder flux as claimed in claim 6 wherein the inert material is a finely divided particle present in an amount in the order of at least 0.3 per cent by weight of the weight of the fusible fluxing ingredient.

9. A solder flux as claimed in claim 8 wherein the finely divided particle is selected from a group consisting of micron-sized particles of fine asbestos, non-fibrous metal silicates, silica, alumina, alumina-silica ceramic and titanium dioxide.

10. A solder flux as claimed in claim 9 wherein the non-fibrous metal silicate is magnesium silicate.

11. In a solder flux of the type adapted to be used on high temperature solder baths wherein the active fluxing ingredient is a fusible zinc-ammonium chloride composition, the improvement which consists of the incorporation therein of an effective amount of at least 0.3 per cent by weight of the weight of the fusible fluxing composition, of a finely divided magnesium silicate.

12. A solder flux as claimed in claim 11 wherein between 0.3 and 11.7 per cent by weight of the weight of the fusible flux composition of finely divided magnesium silicate is incorporated.

13. A solder flux as claimed in claim 11 wherein the magnesium silicate is sufficiently finely divided that substantially all of said magnesium silicate will pass through a 325 mesh screen.

14. A solder flux as claimed in claim 11 wherein the magnesium silicate has an average minor dimension of less than about 10 microns.

15. A solder flux as claimed in claim 7, wherein said inorganic fiber is selected from the group consisting of asbestos, glass fiber, mineral fiber (so-called rock wool), ceramic-alumina-silica fiber, fused quartz fiber, carbon fiber and graphite fiber.

* * * * *